United States Patent [19]

Nishioka

[11] Patent Number: 4,946,889

[45] Date of Patent: Aug. 7, 1990

[54] COATING COMPOSITION

[75] Inventor: Akinori Nishioka, Mie, Japan

[73] Assignee: Atochem North America, Inc., Philadelphia, Pa.

[21] Appl. No.: 362,729

[22] Filed: Jun. 7, 1989

[30] Foreign Application Priority Data

Jun. 24, 1988 [JP] Japan ................. 63-156291

[51] Int. Cl.$^5$ .................... C08J 27/12; C08F 8/00
[52] U.S. Cl. ................. 524/544; 524/588; 524/589; 524/869; 524/871; 524/520; 524/546; 525/104
[58] Field of Search ............ 524/544, 588, 589, 869, 524/871, 520; 525/104

[56] References Cited

U.S. PATENT DOCUMENTS 3,324,069 6/1967 Koblitz et al. .
4,642,249 2/1987 Goll .

FOREIGN PATENT DOCUMENTS 62-174247 7/1987 Japan .................. 524/520
1742471 7/1987 Japan .
62-250017 10/1987 Japan .

Primary Examiner—Joseph L. Schofer
Assistant Examiner—Mark D. Sweet
Attorney, Agent, or Firm—Seidel, Gonda, Lavorgna & Monaco

[57] ABSTRACT

A vinylidene fluoride-based polymer-containing coating composition provides coatings having weather resistance, chemical stability, surface lubricity, and enhanced adhesion to substrates. The composition comprises:
(a) a vinylidene fluoride-based polymer;
(b) an acrylic polymer containing hydrolyzable silyl groups and isocyanate groups; and
(c) at least one organic solvent.

5 Claims, No Drawings

COATING COMPOSITION

FIELD OF THE INVENTION

The invention relates to a coating composition, more particularly to a vinylidene fluoride-based polymer-containing coating composition providing coatings having weather resistance, stain resistance, chemical stability, surface lubricity and adhesion to substrates.

BACKGROUND OF THE INVENTION

Vinylidene fluoride-based polymers are widely used as coating materials, lining materials or molding materials since they have excellent weather resistance, stain resistance, chemical resistance, anti-corrosion properties, and the like.

As is well known, however, vinylidene fluoride-based polymers are chemically inert. Thus, when used as coating materials, they adhere to substrates poorly. In order to improve the poor substrate adhesion properties, it has been proposed to compound an acrylic resin to vinylidene fluoride-based polymers. See, for example, U.S. Pat. Nos. 3,324,069 and 4,642,249, and Japanese Laid-Open Pat. Application No. 174247/1977. The adhesive properties of these acrylic resin-compounded vinylidene fluoride-based resin compositions are unsatisfactory. It is necessary to utilize a primer, such as a primer comprising an epoxy resin and urethane resin, in conjunction with these compositions. Alternatively, it is necessary to compound a large amount of acrylic resin to the vinylidene fluoride-based polymer. Compounding large amounts of acrylic resin, however, reduces the inherent properties of the vinylidene fluoride-based polymer. As a result, the aforementioned excellent properties of the vinylidene fluoride-based polymer are not sufficiently exhibited.

The present invention is intended to overcome the above problems. An object the invention is to provide a vinylidene-fluoride based polymer-containing coating composition capable of forming a coating having excellent weather resistance, stain resistance, chemical stability, surface lubricity, and the like, and excellent adhesion to substrates.

SUMMARY OF THE INVENTION

We have found that the foregoing object is attained by compounding an acrylic polymer containing hydrolyzable silyl groups and isocyanate groups onto a vinylidene fluoride-based polymer, in place of the conventional acrylic resin.

The present invention is thus directed to a coating composition comprising:
(a) a vinylidene fluoride-based polymer;
(b) an acrylic polymer containing hydrolyzable silyl groups and isocyanate groups; and
(c) at least one organic solvent.

DETAILED DESCRIPTION OF THE INVENTION

By "vinylidene fluoride-based polymer" as used herein is meant to include not only homopolymers of vinylidene fluoride, but also copolymers, including terpolymers, of vinylidene fluoride and monomers copolymerizable therewith, such as tetrafluoroethylene, hexafluoropropylene, vinyl fluoride, trifluoroethylene, and the like. Typical examples of such copolymers are vinylidene/tetrafluoroethylene copolymer and vinylidene/tetrafluoroethylen /hexafluoropropylene terpolymer.

By "hydrolyzable silyl groups" is meant silyl groups which may react to form siloxane linkages.

The acrylic polymer containing hydrolyzable silyl groups and isocyanate groups may be easily synthesized by copolymerization of an acrylic monomer containing hydrolyzable silyl groups, and an acrylic monomer containing isocyanate groups, and other copolymerizable acrylic monomers. For example, as mentioned in Japanese Laid-Open Patent Application Nos. 250017/1987 and 30512/1988, the acrylic polymer is produced by copolymerization of acrylic monomers such as isocyanate ethyl methacrylate, isocyanate propyl methacrylate, and the like; vinyl silane compounds such as vinyl triethoxysilane, γ-methacryloxypropyl methoxysilane, and the like; and vinyl monomers such as methyl methacrylate, ethyl methacrylate, butyl methacrylate; 2-ethyl hexyl methacrylate, styrene, acrylonitrile, and the like; in the presence of a radical initiator.

Furthermore, the acrylic polymer used in the practice of the present invention is commercially available.

The vinylidene fluoride-based polymer may be mixed with the acrylic polymer containing silyl groups and isocyanate groups in a weight percent ratio of 40/60 to 95/5, preferably 60/40 to 80/20. If the proportion of vinylidene fluoride-based polymer is in excess of 95% by weight, the adhesion properties of the resulting composition are insufficiently improved. If the proportion of vinylidene fluoride-based polymer is below 40 wt. %, the characteristics of the vinylidene fluoride-based polymer (e.g., weather resistance) are reduced, and a coating composition having the desired properties cannot be obtained.

The organic solvents utilized in the composition of the invention include those organic solvents capable of dissolving or dispersing the vinylidene fluoride-based polymer and the acrylic polymer containing silyl groups and isocyanate groups at a temperature below the boiling point thereof. Specific examples of such solvents include ketones such as acetone, methyl ethyl ketone, methyl isobutyl ketone, cyclohexanone, and the like; esters such as ethyl acetate, butyl acetate, and the like; polar solvents such as dimethyl acetamide, dimethyl formamide, dimethyl sulfoxide, N-methyl-2-pyrrolidone, and the like; and so on. The solvents may be used alone, or as mixtures comprising two or more solvents. Aromatic hydrocarbons such as benzene, toluene and the like, and aliphatic or alicyclic hydrocarbons such as hexane, heptane, cyclohexane and the like may be used in combination with the above-mentioned organic solvent in an amount which does not inhibit the dissolution of the vinylidene fluoride-based polymer.

The amount of the organic solvent employed in the composition is appropriately determined depending on the intended use of the coating composition. Usually, it is preferred that the organic solvent is present in an amount of from about 100 to about 300 parts by weight, per 100 parts by weight of the total weight of the vinylidene fluoride-based polymer and the acrylic polymer.

A conventional acrylic polymer compatible with the vinylidene fluoride-based polymer may also be added to the composition, in an amount which does not seriously effect the desired properties of the resulting coating, such as weather resistance, stain resistance, and the like. If a conventional acrylic polymer is employed in the composition, the proportion of vinylidene fluoride-based polymer in the composition is preferably at least 40% by weight based on the total weight of all polymers in the composition, and the proportion of the acrylic polymer containing silyl groups and isocyanate groups is preferably at least 5% by weight, based on the total weight of all the polymers.

Various known additives, such as organic or inorganic pigments, metal powders such as aluminum, copper and the like, ultraviolet absorbers, antioxidants, and the like may also be added to the coating composition of the invention.

Furthermore, various known catalyst may be added to the composition to accelerate the reaction of the isocyanate groups and the hydrolyzable silyl groups. Specific examples of such catalysts include ester titanates such as tetrabutyltitanate; organic tin compounds such as dibutyl tin dilaurate, tin octylate, and the like; amine compounds such as butylamine, octylamine, and the like; and so on.

The coating composition of the invention may be prepared by mixing the polymers and additives, and dissolving or dispersing the resulting mixture in the organic solvent by known techniques. For example, the polymers and additives may be dispersed in the solvent by employing a dispersion mixer such as a glass bead mill, a homodisperser, and the like.

The coating composition of the invention may be applied to substrates by known techniques such as brush coating, spray coating and the like. When a vinylidene fluoride homopolymer is utilized as the vinylidene fluoride-based polymer in the composition, it is preferred that the coating composition, after coating onto a substrate, is heated to form a coating film, by virtue of the high film-forming temperature of the vinylidene fluoride homopolymer. On the other hand, when a vinylidene fluoride copolymer is utilized in the composition as the vinylidene fluoride-based polymer, it is not necessary to apply heat to the coating, because of the low film-forming temperature of vinylidene fluoride copolymer.

The hydrolyzable silyl groups and isocyanate groups react with moisture in the air and functional groups present in the substrates to form cross-linkages. The cross-linkages contribute to improve the adhesive strength of the coating to the substrate, and contribute to improve the mechanical strength, chemical stability and solvent resistance of the coating. Furthermore, siloxane linkages formed by the hydrolyzable silyl groups contribute to improve the weather resistance of the coating film, and other characteristics of the vinylidene fluoride-based polymer.

The present invention is described in greater detail with reference to the following non-limiting example. All parts stated therein are by weight.

Example 1

Seventy parts of a vinylidene fluoride/tetrafluoroethylene/hexafluoropropylene terpolymer (Kynar® 9301, manufactured by Pennwalt Corp.) and 30 parts of a four-component copolymer of n-butylacrylate, methyl methacrylate, isocyanate ethyl methacrylate and γ-methacryloxypropyl trimethoxysilane (weight ratio: 10/55/20/15) were dissolved in a mixed solvent of 20 parts cyclohexanone, 50 parts of butyl acetate, 50 parts of methyl isobutylketone, and 20 parts of toluene to prepare a colorless and transparent coating composition.

The coating composition of Example 1 was coated onto colored and uncolored galvanized steel panels, respectively, the colored panel having been prepared by coating a galvanized steel panel with primer and a thermosetting acrylic resin paint. The coated panels were allowed to stand for 24 hours at room temperature. Colorless, transparent films were formed on each panel. Each film coating had a thickness of approximately 15 microns.

The coated panels were subjected to weather resistance, adhesion and pencil hardness tests as follows, the data obtained therefrom being presented in Table 1:

Weather Resistance

A portion of the coating was tested for 6,000 hours in a QUV weather resistance accelerating tester.

Adhesion

The adhesion of the coating to the substrate was measured according to JIS K-5400 (ASTM D-3359, cross cut tape test).

Pencil Hardness

The pencil hardness test was performed according to JIS K-5400 (ASTM D-3363, film hardness by pencil test).

Comparative Example 1

A coating was formed in the same manner as in Example 1, except that 30 parts of a terpolymer of n-butyl acrylate, methyl methacrylate and isocyanate ethyl methacrylate (weight ratio: 15/65/20) were used in place of the four-component copolymer of Example 1. The resulting coating was evaluated in the same manner as Example 1. The data are given in Table 1.

From the results provided in Table 1, it may be appreciated that the coating formed from the coating composition of Comparative Example 1, lacking hydrolyzable silyl groups, has poor adhesion to galvanized steel.

Comparative Example 2

A coating was formed in the same manner as in Example 1, except that 30 parts of a terpolymer of n-butyl acrylate, methyl methacrylate and γ-methacryloxypropyl methoxysilane (weight ratio: 15/65/20) were used in place of the four component copolymer of Example 1. The coating was evaluated in the same manner as in Example 1.

From the results set forth in Table 1, it may be appreciated that the coating formed from the coating composition of Comparative Example 2, lacking isocyanate groups, has poor adhesion to the colored steel.

Example 2

Seventy-five parts of polyvinylidene fluoride (Kynar® 500, produced by Pennwalt Corp.) and 25 parts of a four-component copolymer of ethyl acrylate, methyl methacrylate, isocyanate ethyl methacrylate and γ-methacryloxypropyl trimethoxysilane (weight ratio: 10/50/20/20) were ball-milled in a mixed solvent of 20 parts of cyclohexanone, 30 parts of butyl acetate, 50 parts of dimethyl phthalate, and 30 parts of toluene for several hours to prepare a white, milky dispersion. The dispersion was coated onto a galvanized steel panel and a colored steel panel with a doctor blade and baked at 200° C. for 20 minutes. The thickness of the resulting colorless and transparent films was 20 microns each. Each coated panel was tested as above. The results are set forth in Table 1.

TABLE 1

| Substrates | Test Items | Example 1 | Example 2 | Comparative Example 1 | Comparative Example 2 |
|---|---|---|---|---|---|
| Galvanized steel | Adhesion | 100/100 | 100/100 | 10/100 | 100/100 |
| | Pencil hardness | 2H | 2H | H | H |
| | Weather resistance | excellent (no change) | excellent (no change) | excellent (no change) | excellent (no change) |
| Colored steel | Adhesion | 100/100 | 100/100 | 80/100 | 0/100 |
| | Pencil hardness | 2H | 2H | H | H |
| | Weather resistance | excellent (no change) | excellent (no change) | excellent (no change) | excellent (no change) |

In the coating composition of the present invention, the vinylidene fluoride-based polymer has good compatibility with the acrylic polymer containing hydrolyzable silyl groups and isocyanate groups. A uniform coating film may be formed. Furthermore, the coating composition of the present invention has excellent adhesion to any substrate, either organic or inorganic, while maintaining the excellent characteristics of the vinylidene fluoride-based polymer. Therefore, the coating composition of the invention provides a coating which not only has excellent weather resistance, stain resistance, chemical stability and mechanical properties, but also excels in adhesion to substrates.

The present invention may be embodied in other specific forms without departing from the spirit or essential attributes thereof and, accordingly, reference should be made to the appended claims, rather than to the foregoing specifications, as indicating the scope of the invention.

I claim:

1. A coating composition comprising:
   (a) a vinylidene fluoride-based polymer selected from the group consisting of vinylidene/tetrafluoroethylene copolymer, vinylidene/tetrafluoroethylene/hexafluoropropylene terpolymer and mixtures thereof;
   (b) an acrylic polymer containing hydrolyzable silyl groups and isocyanate groups; and
   (c) at least one organic solvent; wherein the vinylidene fluoride-based polymer (a) comprises from 40% to 95% by weight of the combined weight of polymers (a) and (b), and the organic solvent (c) is present in the amount of from about 100 to about 300 parts per 100 parts by weight of the combined weight of polymers (a) and (b).

2. A composition according to claim 1 wherein the vinylidene fluoride-based polymer comprises from 60% to 80% by weight of the total weight of the vinylidene fluoride-based polymer and the acrylic polymer containing hydrolyzable silyl groups and isocyanate groups.

3. A composition according to claim 1 additionally containing an acrylic polymer other than an acrylic polymer containing hydrolyzable silyl groups and isocyanate groups.

4. A composition according to claim 1 further containing a catalyst for reacting the isocyanate groups and the hydrolyzable silyl groups on the acrylic polymer containing said groups.

5. A composition according to claim 1 comprising the following, all parts being by weight:
   (a) 70 parts of a vinylidene fluoride/tetrafluoroethylene/hexafluoropropylene terpolymer;
   (b) 30 parts of a copolymer formed from n-butylacrylate, methyl methacrylate, isocyanate ethyl methacrylate and γ-methacryloxypropyl trimethoxysilane, in the weight ratio 10/55/20/15; and
   (c) a solvent comprising 20 parts of cyclohexane, 50 parts of butyl acetate, 50 parts of methyl isobutylketone, and 20 parts of toluene.

* * * * *